(12) United States Patent (10) Patent No.: US 8,934,339 B2
Suzuki et al. (45) Date of Patent: Jan. 13, 2015

(54) METHOD AND APPARATUS FOR ENHANCEMENTS FOR DE-PRIORITIZATION BY RRC CONNECTION REJECT IN LTE

(71) Applicant: Research In Motion Limited, Waterloo (CA)

(72) Inventors: Takashi Suzuki, Ichikawa (JP); Ayman Ahmed Mahmoud Abdel-Samad, Waterloo (CA); Dinesh Kumar Arora, Kitchener (CA); Mohamed Galal El-Din Ebrahim, Kitchener (CA)

(73) Assignee: BlackBerry Limited, Waterloo, CA (US)

( * ) Notice: Subject to any disclaimer, the term of this patent is extended or adjusted under 35 U.S.C. 154(b) by 155 days.

(21) Appl. No.: 13/827,770

(22) Filed: Mar. 14, 2013

(65) Prior Publication Data

US 2014/0198640 A1    Jul. 17, 2014

Related U.S. Application Data

(60) Provisional application No. 61/753,866, filed on Jan. 17, 2013.

(51) Int. Cl.
*G01R 31/08* (2006.01)
*H04L 12/917* (2013.01)

(52) U.S. Cl.
CPC .................................... *H04L 47/76* (2013.01)
USPC ......................................................... 370/230

(58) Field of Classification Search
CPC ......... H04L 47/10; H04L 47/11; H04L 47/15; H04L 47/30; H04L 43/50; H04L 43/0852; H04W 24/00
USPC ................ 370/229, 230, 235, 252, 254, 310, 370/310.2, 313, 328, 331, 338, 389
See application file for complete search history.

(56) References Cited

U.S. PATENT DOCUMENTS 8,731,477 B2 *   5/2014  Ekici .......................... 455/67.11
2003/0161294 A1 * 8/2003  Yepez et al. .................. 370/352
2013/0095879 A1 * 4/2013  Gupta et al. .................. 455/525

FOREIGN PATENT DOCUMENTS

WO    2013066060 A1    5/2013
WO    2013066123 A1    5/2013

OTHER PUBLICATIONS

International Search Report for International Application No. PCT/CA2014/000022 mailed Apr. 8, 2014.
3GPP TS 36.304, "Evolved Universal Terrestrial Radio Access (E-UTRA); User Equipment (UE) procedures in idle mode," V.11.2.0, Release 11, Feb. 2013.

(Continued)

*Primary Examiner* — Anh Ngoc Nguyen
(74) *Attorney, Agent, or Firm* — Moffat & Co.

(57) ABSTRACT

A method and apparatus for enhancements for de-prioritization by RRC connection reject, where the enhancements relate, in one aspect, to faster cell reselection to prevent possible service outages. In a further aspect the enhancements relate to release, suspension or resumption of de-prioritization upon PLMN selection. In a further aspect, the enhancements relate to conflict handling with a CSG cell priority. In a further aspect, the enhancements relate to connected mode UE handling. In a further aspect, the enhancements relate to cancellation of a de-prioritization request.

33 Claims, 8 Drawing Sheets

(56) References Cited

OTHER PUBLICATIONS

3GPP TS 36.331, "Evolved Universal Terrestrial Radio Access (E-UTRA); Radio Resource Control (RRC); Protocol specification," V.11.2.0, Release 11, Feb. 2013.
3GPP TS 36.304, "Evolved Universal Terrestrial Radio Access (E-UTRA); User Equipment (UE) procedures in idle mode," V.11.6.0, Release 11, Jan. 2014.
3GPP TS36.304 v11.1.0 (Sep. 2012), in particular, Section 5.2.4.1, 5.2.7 and 5.2.9.
TS36.331 v11.1.0, in particular, Section 5.3.3.8 (Sep. 2012).
Alcatel Lucent et al, R2-125163 RAN overload handling using RRC Connection Rejection (CR to 36.331), Oct. 8-12, 2012.
Nokia Siemens Network et al, R2-125164 RAN overload handling using RRC Reject (CR to 36.304), Oct. 8-12, 2012.
Alcatel Lucent et al, R2-125833 RAN overload handling using RRC Connection Rejection (CR to 36.331), Nov. 12-16, 2012.
Nokia Siemens Networks et al, R2-125871 RAN overload handling using RRC Reject (CR to 36.304), Nov. 12-16, 2012.
LG Electronics, R2-125810 Resolving priority conflict, Nov. 12-16, 2012.
Samsung, R2-125800 Conflicting reselection priorities, Nov. 12-16, 2012.
LG Electronics, R2-125814 Clarification of reselection during de-prioritization, Nov. 12-16, 2012.
Renesas Mobile Europe Ltd, 3GPP TS36.133R2-123777 Redirection/Reselection on RRC Connection Reject, Aug. 17, 2012.
Nokia Siemens Networks et al., R2-124452 "RAN overload handling using RRC Reject", (CR to TS 36.304), Oct. 8-12, 2012.
Nokia Siemens Networks et al., R2-125033 "RAN overload handling using RRC Reject", (CR to TS 36.304), Oct. 8-12, 2012.
Nokia Siemens Networks et al., R2-125153 "RAN overload handling using RRC Reject", (CR to TS 36.304), Oct. 8-12, 2012.
Alcatel-Lucent et al., R2-124955 "RAN overload handling using RRC connection Rejection", (CR to TS 36.331), Oct. 8-12, 2012.
Alcatel-Lucent et al., R2-125034 "RAN overload handling using RRC connection Rejection", (CR to TS 36.331), Oct. 8-12, 2012.
Nokia Corporation et al., R2-124576 "NW failure and UE reselection", 3GPP TSG-RAN WG2 Meeting #79, Aug. 13-17, 2012.
LG Electronics Inc., R2-124770 "Resolving priority conflict", 3GPP TSG-RAN WG2 #79bis, Oct. 8-12, 2012.

* cited by examiner

METHOD AND APPARATUS FOR ENHANCEMENTS FOR DE-PRIORITIZATION BY RRC CONNECTION REJECT IN LTE

FIELD OF THE DISCLOSURE

The present disclosure relates to mobile network frequency or radio access technology selection and, in particular, relates to de-prioritization of a frequency or radio access technology (RAT).

BACKGROUND

In a mobile network, a network node may send a de-prioritization request to a user equipment (UE) for a current frequency or radio access technology. Such a request may be made in order to alleviate network congestion or provide for overload control.

However, while a de-prioritization request may temporarily designate the current frequency or RAT as a low priority at the UE, it may be a long time before a UE reselects to a higher priority layer even after de-prioritization.

Further, even after a public land mobile network (PLMN) change, a de-prioritized frequency or RAT may still be de-prioritized, even if that frequency is reused in the new PLMN.

In addition, if a closed subscribed group (CSG) cell is utilizing the same frequency that has been de-prioritized, the UE may not be able to connect to the CSG cell even though this would also alleviate congestion.

Further, a connected mode UE may attempt to access a de-prioritized RAT or frequency when the connection is released or after radio link failure. Further, network conditions may change rapidly and de-prioritization may not be necessary for the previously signalled duration.

BRIEF DESCRIPTION OF THE DRAWINGS

The present disclosure will be better understood with reference to the drawings, in which.

DETAILED DESCRIPTION OF THE DRAWINGS

Figure 1:
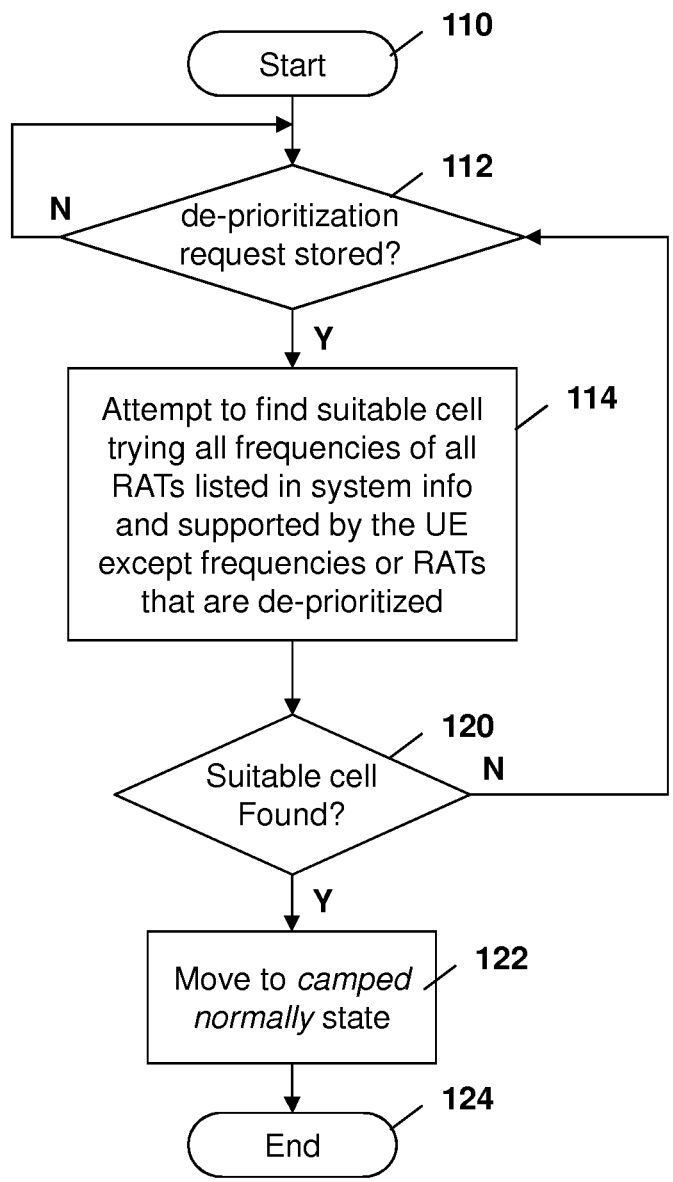
FIG. 1 is a flow diagram showing an attempt at a user equipment to find suitable cells when a de-prioritization request is stored.

The present disclosure provides a method at a user equipment comprising: storing a de-prioritization request; and removing or suspending the de-prioritization request at the user equipment upon a selection of public land mobile network at the user equipment.

The present disclosure further provides a user equipment comprising: a processor; memory; and a communications subsystem, wherein the user equipment is configured to: store a de-prioritization request; and remove or suspend the de-prioritization request at the user equipment upon a change to a new public land mobile network at the user equipment.

The present disclosure further provides a method at a user equipment comprising: receiving a de-prioritization request; and transitioning to a camped on Any Cell state at the user equipment.

The present disclosure further provides a user equipment comprising: a processor; and a communications subsystem, wherein the user equipment is configured to: receive a de-prioritization request; and transition to a camped on Any Cell state at the user equipment.

The present disclosure further provides a method at a user equipment comprising: receiving a priority for a frequency or radio access technology; and attempting to find a suitable cell trying frequencies of radio access technologies listed in system information in an order of priority.

The present disclosure further provides a user equipment comprising: a processor; and a communications subsystem, wherein the user equipment is configured to: receive a priority for a frequency or radio access technology; and attempt to find a suitable cell trying frequencies of radio access technologies listed in system information in an order of priority.

The present disclosure further provides a method at a user equipment comprising: storing a de-prioritization request from a macro cell; entering a closed subscriber group cell having a frequency within the de-prioritization request; configuring the frequency as a highest priority frequency while the user equipment detects the closed subscriber group cell; receiving from the closed subscriber group cell a de-prioritization request for the serving frequency; storing an indication of de-prioritization for the closed subscriber group cell; and avoiding reselecting to a closed subscriber group cell on a frequency or radio access technology which is de-prioritized.

The present disclosure further provides a user equipment comprising: a processor; memory; and a communications subsystem, wherein the user equipment is configured to: store a de-prioritization request from a macro cell; enter a closed subscriber group cell having a frequency within the de-prioritization request; configure the frequency as a highest priority frequency while the user equipment detects the closed subscriber group cell; receive from the closed subscriber group cell a de-prioritization request for the serving frequency; store an indication of de-prioritization for the closed subscriber group cell; and avoid reselecting to a closed subscriber group cell on a frequency or radio access technology which is de-prioritized.

The present disclosure further provides a method at a user equipment comprising: receiving, while in a connected mode with a network element, a message including a de-prioritization request; and upon entering idle mode, ranking frequencies and radio access technologies within the de-prioritization request as low priority frequencies.

The present disclosure further provides a user equipment comprising: a processor; and a communications subsystem, wherein the user equipment is configured to: receive, while in a connected mode with a network element, a message including a de-prioritization request; and upon entering idle mode, rank frequencies and radio access technologies within the de-prioritization request as low priority frequencies.

The present disclosure is discussed below with regard to the 3$^{rd}$ Generation Partnership Project (3GPP) Long-Term Evolution (LTE) technical specifications, however, the present disclosure is not limited to such technology and the embodiments of the present disclosure could be utilized with other technologies utilizing similar messaging.

The radio resource control protocol for the radio interface between a UE and the Evolved Universal Terrestrial Radio Network (E-UTRAN) as well as for the radio interface between the radio network and the E-UTRAN is defined in the 3GPP Technical Specification (TS) 36.331, "Evolved Universal Terrestrial Radio Access (E-UTRA); Radio Resource Control (RRC); Protocol Specification", v. 11.2.0, Jan. 3, 2013, the contents of which are incorporated herein by reference. Within the 3GPP TS 36.331 Technical Specification, an RRCConnectionReject message is used to reject an RRC connection establishment attempt.

In version 11.2.0 of the 3GPP TS 36.311 specification, a de-prioritization request is included within the RRCConnectionReject message. This de-prioritization request may be used to request de-prioritization of the frequency for which the RRC connection request was made, for a particular time period.

A de-prioritization request is shown in bold in Table 1 below.

TABLE 1

RRCConnectionReject Message

```
-- ASN1START
RRCConnectionReject ::=            SEQUENCE {
      criticalExtensions           CHOICE {
         c1                        CHOICE{
            rrcConnectionReject-r8    RRCConnectionReject-r8-IEs,
            spare3 NULL, spare2 NULL, spare1 NULL
         },
         criticalExtensionsFuture  SEQUENCE { }
      }
}
RRCConnectionReject-r8-IEs ::=     SEQUENCE {
      waitTime                     INTEGER (1..16),
      nonCriticalExtension         RRCConnectionReject-v8a0-IEs
      OPTIONAL
}
RRCConnectionReject-v8ao-IEs ::=   SEQUENCE {
      lateNonCriticalExtension     OCTET STRING
      OPTIONAL,  -- Need OP
      nonCriticalExtension         RRCConnectionReject-v1020-IEs
      OPTIONAL
}
RRCConnectionReject-v1020-IEs ::=  SEQUENCE {
      extendedWaitTime-r10         INTEGER (1..1800)      OPTIONAL, --
Need ON
      nonCriticalExtension                  RRCConnectionReject-v11xy-IEs
}
RRCConnectionReject-v11xy-IEs ::=  SEQUENCE {
   deprioritisationReq-r11         SEQUENCE {
      deprioType        ENUMERATED {frequency, e-utra}
      deprioritisationTimer-r11    ENUMERATED {min5, min10, min15, min30}
                                   OPTIONAL, -- Need ON
   }
   nonCriticalExtension  SEQUENCE { }         OPTIONAL -- Need OP
}
-- ASN1STOP
```

As seen in Table 1 above, the de-prioritization request can be for a type of connection (frequency or e-utra) as well as for a particular time period.

The RRCConnectionReject field descriptions pertaining to the de-prioritization request are shown in Table 2 below.

TABLE 2

| RRCConnectionReject field descriptions |
| --- |
| deprioritisationReq |
| deprioritisationReq indicates whether the current frequency or RAT is to be deprioritised. If another deprioritisationReq is received before t325 expiry, the UE shall be able to store 8 deprioritisationReq |
| deprioritisationTimer |
| Indicates the period for which the signalled carrier or E-UTRA is deprioritised.<br>Value minN corresponds to N minutes. |
| extendedWaitTime |
| Value in seconds for the wait time for Delay Tolerant access requests. |
| waitTime |
| Wait time value in seconds. |

As seen in Table 2 above, the de-prioritization request indicates whether the current frequency or radio access technology is to be de-prioritized. Further, a timer is enumerated which has a value in minutes corresponding to the time which the radio access technology should be de-prioritized.

If a UE receives the de-prioritization request, the UE stores the de-prioritization request until the de-prioritization timer expiry, irrespective of any other cell reselection absolute priority assignments received through dedicated or common signaling. Further, the de-prioritization request is stored regardless of any RRC connections in the E-UTRA or other radio access technologies.

The UE considers the current carrier frequency and stored frequencies due to previously received RRC connection request reject messages having a de-prioritization request, or all of the frequencies of an E-UTRA to be a lowest priority frequency while a timer T325 is running, irrespective of camped radio access technology. The lowest priority frequency is lower than the eight network configured values for a user equipment.

A de-prioritization request may, however, have an impact on cell reselection priorities for closed subscriber group (CSG) cells, which are typically femto cells having a limited number of UEs that form a subscriber group, as well as for multimedia broadcast multicast services (MBMS), which are designed to provide delivery of broadcast and multicast services within an area.

Two approaches for dealing with the impact on the MBMS case that assume that the UE is camping on a frequency which is de-prioritized are: to apply the highest priority for the concerned frequency while de-prioritization is applied for that frequency; or to apply the lowest priority for the concerned frequency while de-prioritization is applied for that frequency.

In the case of the first approach, the UE can continue to receive the MBMS service without experiencing service suspensions in RRC IDLE even after the UE receives the de-prioritization command. However, the MBMS users may attempt to re-establish the RRC connections repeatedly until extensive Access Class Barring (ACB) is to be initiated.

With the second approach, the MBMS service is suspended since the UE applies de-prioritization for the MBMS frequency. Therefore, upon receiving an establishment connection on a frequency not being de-prioritized, the network can choose to control connected UEs by deciding whether the UE may or may not be handed over to the congested MBMS frequency when the congestion takes place on the MBMS frequency based on the MBMS interest indication from the UE.

For the second scenario, the UE can establish a connection on a non-MBMS frequency after receiving the de-prioritization on the MBMS frequency where a connection establishment is likely to succeed.

A UE may implement a solution for de-prioritization of an MBMS frequency. Assuming that an operator uses a strong ACB in the extreme overload cases which lead to the usage of new de-prioritization mechanisms, a UE staying on the cell while preferring unicast may have detrimental effects for the UE. Thus, if there is a conflict in priority for an LTE frequency due to MBMS prioritization conflicting with RRCConnectionReject de-prioritization, the UE behavior may be specified for cases of UE prioritizing unicast or UE prioritizing MBMS separately.

In the case of CSG, in some embodiments, the UE could be tasked with implementing a smart policy to still attempt to connect to a CSG frequency even after that frequency has been de-prioritized. However, UEs not implementing such intelligence would not try to establish such connection to a CSG cell and would thus still receive service on another frequency or radio access technology. Thus, in some embodiments a UE may be required to apply the prioritization of the CSG frequency when in the coverage of the CSG member cell.

Further, 3GPP TS 36.304, "Evolved Universal Terrestrial Radio Access (E-UTRA); User Equipment (UE) Procedures in Idle Mode", Version 11.2.0, Jan. 3, 2013, the contents of which are incorporated herein by reference, provides for an "Any Cell state". A definition for "Any Cell selection" and "camped on Any Cell state" are provided in Section 5.2.8 and Section 5.2.9 of the 3GPP TS 36.304 specification. Basically, in Any Cell selection state, the UE attempts to find any acceptable cell of any PLMN to camp on, trying all RATs that are supported by the UE and searching first for a high quality cell. In camped on Any Cell state, while the UE is camping on an acceptable cell, the UE regularly attempts to find a suitable cell.

One option, for a UE which is in camped on Any Cell state is to ignore de-prioritizations in those states in order to not prevent the UE from searching for an acceptable cell.

The above, however, may lead to several issues.

Possible Service Outage

According to 3GPP TS 36.133, "Evolved Universal Terrestrial Radio Access (E-UTRA); Requirements for support of radio resource management", Version 11.2.0, September 2012, cell reselection requires:

The UE shall search every layer of higher priority at least every Thigher_priority_search=(60*Nlayers) seconds, where Nlayers is the total number of configured higher priority E-UTRA, UTRA FDD, UTRA TDD, CDMA2000 1x and HRPD carrier frequencies and is additionally increased by one if one or more groups of GSM frequencies is configured as a higher priority.

Thus, if de-prioritization is requested, the current frequency instantly becomes the lowest priority frequency. However, such lowering of the priority does not cause the UE to instantly reselect to a different, higher priority frequency. It may in fact take a long time before the UE reselects to a higher priority frequency after the de-prioritization when there are multiple numbers of frequencies to monitor.

During this time, the UE may continue to make attempts to access the network through the de-prioritized frequency. A wait time may be indicated by the RRCConnectionReject message in order to delay a next access attempt, but may be too short to prevent the UE from accessing the frequency to which the de-prioritization was requested if the UE still stays on the frequency. If the UE attempts to access the frequency again, it will be rejected again, and the RRCConnectionReject could again include a wait time for re-attempt where such wait time could be up to 16 seconds. The wait time at the UE results in the service outage until the UE finds a suitable cell in a frequency which is not de-prioritized.

In some cases a target frequency may be provided to the UE by the network element in the RRCConnectionReject by signalling an index to the list of frequencies included in the system information, for example System Information Block 5 (SIB5). However, such blind redirection without any measurement reports may put the UE in a bad radio condition where the UE does not have a good reception in terms of, for example, Reference Signal Received Power (RSRP) or Reference Signal Received Quality (RSRQ).

The attempt to camp on a suitable cell in a redirected frequency thus may take some time due to bad radio conditions in the indicated frequencies, which may result in service outages. Such service outages may lead to the inability of a UE to make an emergency call or receive a call during attempted camping on the suitable cell. Moreover, the indicated frequency for redirection may not even be supported by the UE. If the UE is redirected to a frequency that is not supported, the UE may stay in the current frequency, which would also result in a service outage.

De-Prioritization Continues after PLMN Change

A second issue with the above is that in accordance with current specifications, de-prioritization continues even after a PLMN change. A mobile user may not be able to use frequencies or E-UTRAN even if there is no congestion in a new PLMN on that frequency or RAT while the timer is still running.

When a UE selects a new PLMN or changes the PLMN, in most cases the carrier frequencies in use in the first PLMN which has been de-prioritized are unlikely to be used in the new PLMN. However, some network sharing situations are possible where a certain frequency used by the first PLMN might also be used by the second PLMN.

In some cases it may be appropriate for the frequency to remain de-prioritized as the second PLMN may be relying on the same congested eNB or core network node. However, in other situations the frequency may be used by both PLMNs. For example, in a country border crossing scenario, the same frequency may be used for PLMNs on both sides of the border. In this case it may be inappropriate to continue to de-prioritize the frequency.

Further, if all E-UTRA frequencies are de-prioritized based on the de-prioritization of a radio access technology, this may be problematic because the UE may not be able to use a particular radio access technology in the new PLMN. For example, if LTE is de-prioritized on a first PLMN for 30 minutes, it may be inappropriate to continue de-prioritizing LTE on a second PLMN since the UE is effectively forced to use a different RAT in this case until the T325 timer expires.

Handling a Priority Conflict with CSG Cells

As indicated above, one way for handling conflict between a cell reselection to CSG cell and a de-prioritization request in the priority of frequency layers may be through a UE implementation. UE implementation may apply the highest or lowest priority for the frequency on which a suitable CSG cell is detected while de-prioritization is applied for that frequency.

If the handling of the conflict is completely left to UE implementation, the network may have no control over UEs coming into a CSG cell on the de-prioritized frequency. For example, CSG cells may produce interference to congested neighbor macro cells, worsening the quality of the already congested macro cells in some deployment scenarios. In order to prevent this, the network may employ a measure to de-prioritize a CSG frequency in accordance with one embodiment of the present disclosure.

Further, in an RRC Connected Mode, when the serving frequency of the CSG cell or other frequencies have been de-prioritized by a macro cell issuing one or more RRCConnectionReject messages, the CSG cell may still request the UE to measure those frequencies because the CSG cells are not tightly coordinated with macro cells in general. If the UE goes out of the CSG cell coverage, the CSG cell may then start to initiate a handover to the macro cell on one of de-prioritized frequencies.

The handover preparation request from the source CSG cell may be rejected by the target macro eNB. In this case, the CSG cell may start measuring other frequencies in order to find another target cell for handover. However, this may be too late for a successful handover because the UE is losing the CSG coverage. Moreover, the second frequency chosen for the measurement may be also de-prioritized in some embodiments.

Further, in RRC idle mode, if the UE gives the highest priority to the de-prioritized frequency when the UE sees its CSG cell, this may further deteriorate an overload situation when the UE leaves the CSG cell and re-enters the macro cell if the UE accesses the macro cell. Cell reselection to other frequencies or RATs should, in some embodiments, be performed as quickly as possible upon the UE leaving the CSG cell.

De-Prioritization for Connected Mode UEs

The de-prioritization messages above are used only to address idle mode UEs camping on a congested frequency or RAT. When a network releases a connection or rejects re-establishment requests, the UE may access the de-prioritized frequency or RAT, which may worsen congestion.

When the network is overloaded, the network may provide redirected carrier information or dedicated priorities in RRC connection release in order to avoid the congested frequencies or RAT upon releasing RRC connection. However, the UE may come back to the congested frequency or RAT due to further reselections or the dedicated priority may be removed upon RRC state transition. For example, a dedicated priority may be removed upon RRC connection establishment in LTE. After that, the UE may be handed over to UTRAN and the UTRAN may not provide a lower priority for the congested LTE frequency. Then the UE may reselect to the congested LTE frequency.

Cancellation of the De-Prioritization Request

Once the UE receives the de-prioritization request, the UE considers the frequency or RAT to be de-prioritized for an enumerated number of minutes using the T325 timer, even though the cause for the de-prioritization may be removed and the concerned frequency or RAT may be become available for use again. For example, the T325 timer may be set to 30 minutes, but the congestion may be alleviated after 5 minutes. In this case the UE still considers the frequency de-prioritized even though it could now support the UE.

Further, even with an active de-prioritization request, the UE may have to camp on the de-prioritized frequency or RAT in some cases. For example, when a suitable cell can be found only on a de-prioritized frequency, the UE will camp on a cell of the frequency. Upon a higher layer request or receiving paging while camping on a cell of a de-prioritized frequency, the UE will transmit an RRCConnectionRequest.

If the network does not reject the request, it is not clear whether the UE should maintain or remove the de-prioritization request because the UE does not know whether the network is not congested anymore or the network has accepted the request even in congestion. In one embodiment, the UE may need to know what to do with a stored de-prioritization request when an RRC connection request is not rejected on the de-prioritized frequency.

In order to overcome the issues above, the present disclosure provides for various embodiments.

Faster Cell Reselection to Prevent Possible Service Outage

In one embodiment, upon receiving a de-prioritization request or at any time that the faster cell reselection is required, the UE may regularly attempt to find a suitable cell on frequencies listed in system information and supported by the UE, in order from high to low priority, in addition to performing necessary measurements for the cell reselection evaluation procedures. This may be done in order to speed up cell reselection.

In accordance with one embodiment, the UE may act as if it were in "camped on Any Cell state" upon reception of de-prioritization request in order to utilize a modified cell selection process and regularly attempting to find a cell on frequencies listed in system information whose priorities are higher than the lowest priority.

Further, during a "camped on the Any Cell" state while de-prioritization is active, the UE may exclude the de-prioritized frequencies or RATs when regularly attempting to find a suitable cell.

Alternatively, the UE may attempt to select a suitable cell on a supported frequency of all RATs whose absolute priority is given and not de-prioritized in the order of the absolute priorities.

Thus, the UE may consider that it is in camped on an Any Cell state upon receiving the de-prioritization request and find suitable frequencies which are not de-prioritized. If the UE does not find a suitable cell in the frequency or RAT which is not de-prioritized after a certain time, the UE may normally camp on the current frequency.

In one example, to implement the above, section 5.2.9 of the 3GPP TS 36.304 Specification may be amended in accordance with the bold section of Table 3 below.

TABLE 3

Section 5.2.9 Camped on Any Cell state

Section 5.2.9 Camped on Any Cell state
In this state, the UE shall perform the following tasks:
    select and monitor the indicated paging channels of the cell as specified in clause 7;
    monitor relevant System Information as specified in [3];
    perform necessary measurements for the cell reselection evaluation procedure;
    execute the cell reselection evaluation process on the following occasions/triggers:
    1) UE internal triggers, so as to meet performance as specified in [10];
    2) When information on the BCCH used for the cell reselection evaluation procedure has been modified;
    3) When de-prioritization request is stored;
    regularly attempt to find a suitable cell trying frequencies of all RATs that are listed in system information and supported by the UE except the frequencies or RAT which are de-prioritized. If a suitable cell is found, UE shall move to camped normally state; if the UE supports voice services and the current cell does not support emergency call as indicated in System information specified in [3], the UE should perform cell selection/reselection to an acceptable cell of any supported RAT regardless of priorities provided in system information from current cell, if no suitable cell is found.

As seen in Table 3 above, one of the triggers to execute the cell selection evaluation process is when a de-prioritization request is stored. Further, as outlined in Table 3 above, the attempt to find a suitable cell excludes the frequencies or RATs which are de-prioritized.

In camped on Any Cell state, the UE may respond to paging and may make an emergency call, and thus service outage may be avoided. Further, the UE may find a suitable cell in a frequency or RAT which is not de-prioritized faster by regularly attempting to find suitable cells by excluding frequencies which are not de-prioritized.

Reference is now made to FIG. 1, which shows a process at a UE to perform the above. The process of FIG. 1 starts at block 110 and proceeds to block 112 in which a check is made to determine whether de-prioritization request is stored. If no, the process proceeds back to block 112 and continues to loop. Alternatively, the iteration may be terminated after a certain time has passed since de-prioritization request was stored.

Once a de-prioritization request is stored, the process proceeds to block 114 in which the UE attempts to find a suitable cell, trying all frequencies of all RATs listed in the system information and supported by the UE, except frequencies or RATs which are de-prioritized, while performing necessary measurements for the cell reselection evaluation procedure.

From block 114 the process proceeds to block 120 in which a check is made to determine whether a suitable cell was found. If no, the process proceeds back to block 112 to attempt to find a suitable cell.

If, the check at block 120 determines that a suitable cell was found, the process proceeds to block 122 in which the UE moves to a camped normally state and then to block 124 in which the process ends.

In an alternative embodiment, the UE may regularly attempt to camp on a suitable cell trying all frequencies of RATs that are supported by the UE in order of absolute priority considering de-prioritized frequencies or RATs to be the lowest priority.

One example of modifications to Section 5.2.9 of the 3GPP TS 36.304 Specification are shown below with regard to Table 4.

TABLE 4

Section 5.2.9 Camped on Any Cell state

Section 5.2.9 Camped on Any Cell state
In this state, the UE shall perform the following tasks:
    select and monitor the indicated paging channels of the cell as specified in clause 7;
    monitor relevant System Information as specified in [3];
    perform necessary measurements for the cell reselection evaluation procedure;
    execute the cell reselection evaluation process on the following occasions/triggers:
    1) UE internal triggers, so as to meet performance as specified in [10];
    2) When information on the BCCH used for the cell reselection evaluation procedure has been modified;
    3) When de-prioritization request is stored;
    if a frequency or RAT is de-prioritized:
        Regularly attempt to find a suitable cell trying frequencies of all RATs that are listed in system information, supported by the UE in the order of the absolute priority considering de-prioritized frequencies as lowest priority. If a suitable cell is found, UE shall move to camped normally state;
    else: regularly attempt to find a suitable cell trying all frequencies of all RATs that are supported by the UE. If a suitable cell is found, UE shall move to camped normally state; if the UE supports voice services and the current cell does not support emergency call as indicated in System information specified in [3], the UE should perform cell selection/reselection to an acceptable cell of any supported RAT regardless of priorities provided in system information from current cell, if no suitable cell is found.

As seen in Table 4 above, the cell selection evaluation process is executed on a number of triggers and Table 4 shows the addition of the de-prioritization request as a trigger for such cell reselection evaluation.

Further, as seen in Table 4, if a frequency of a RAT is de-prioritized then the cell selection evaluation includes regularly attempting to find a suitable cell trying all frequencies of all RATs that are listed in system information and supported by the UE in an order of absolute priority where the de-prioritized frequencies are considered to be the lowest priority.

Figure 2:
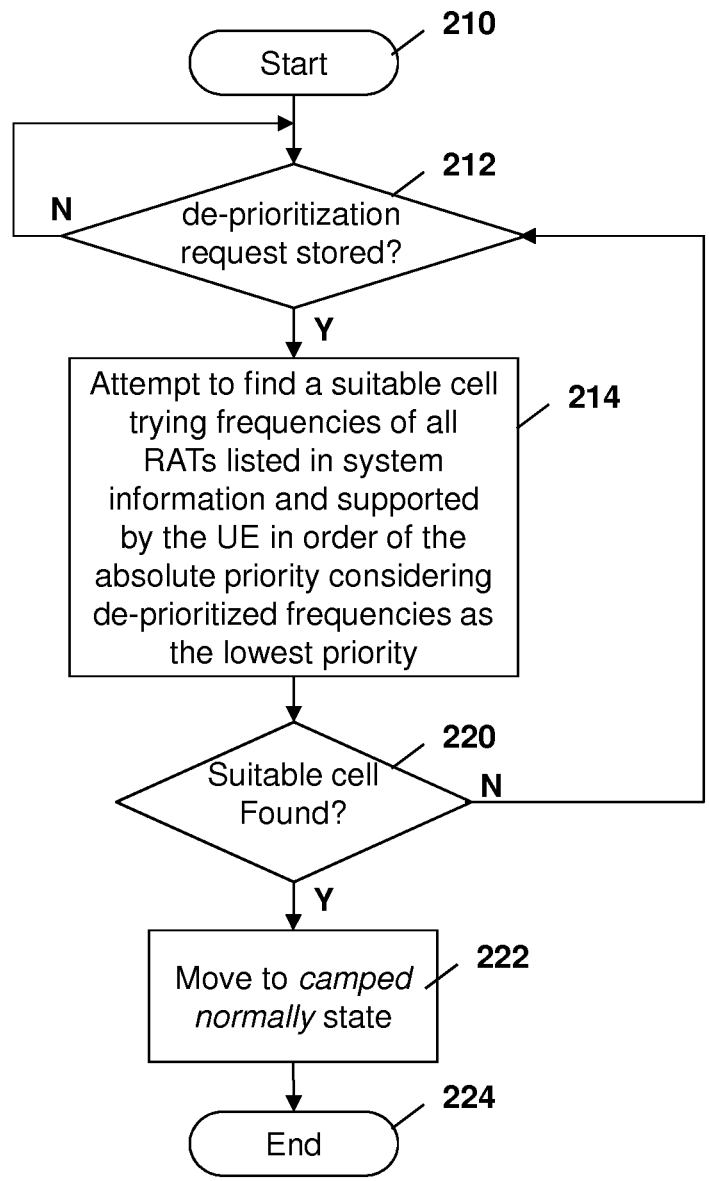
FIG. 2 is a further embodiment of a flow diagram showing an attempt at a user equipment to find suitable cells when a de-prioritization request is stored.

Reference is now made to FIG. 2. The process of FIG. 2 starts at block 210 and proceeds to block 212 in which a check is made to determine whether de-prioritization request is stored. If no, the process proceeds back to block 212.

If a de-prioritization request is stored, the process proceeds to block 214 in which, when a frequency of a RAT is de-prioritized, the UE attempts to find a suitable cell trying all frequencies of all RATs that are listed in system information and supported by the UE in an order of absolute priority, where the de-prioritized frequencies are considered as the lowest priority in addition to performing necessary measurements for the cell reselection evaluation procedure.

From block 214, the process proceeds to block 220 in which a check is made to determine a suitable cell was found. If yes, the process proceeds to block 222 in which the UE moves to a camped normally state and the process proceeds to block 224 and ends.

From block 220 if no suitable cell was found the process proceeds back to block 212 to continue to loop to attempt to find a suitable cell. Alternatively, the iteration may be terminated after a certain time has passed since de-prioritization request was stored.

In a further alternative embodiment, instead of applying a camped on any cell state with modified cell selection evaluation, upon receiving a de-prioritization request or in case faster cell reselection is required, the UE may camp on a suitable cell normally if the UE finds a suitable cell on the current frequency at first and performs cell reselection evaluation. In addition, the UE may start regularly attempting to find a suitable cell trying all frequencies of all RATs that are supported and not de-prioritized in order of absolute priority for a certain period. This alternative embodiment may be utilized not only when de-prioritization request is received but also when fast cell reselection is required or desired.

The further alternative embodiment may be realized, for example, by amending Section 5.2.4.1 of 3GPP TS 36.304, as shown in Table 5 below.

As seen in Table 5, the bold addition indicates that upon the change of priority due to de-prioritization, the UE should start regularly attempting to find a suitable cell, trying frequencies of all RATs that are listed in system information and supported in the priority order for a certain period.

Figure 3:
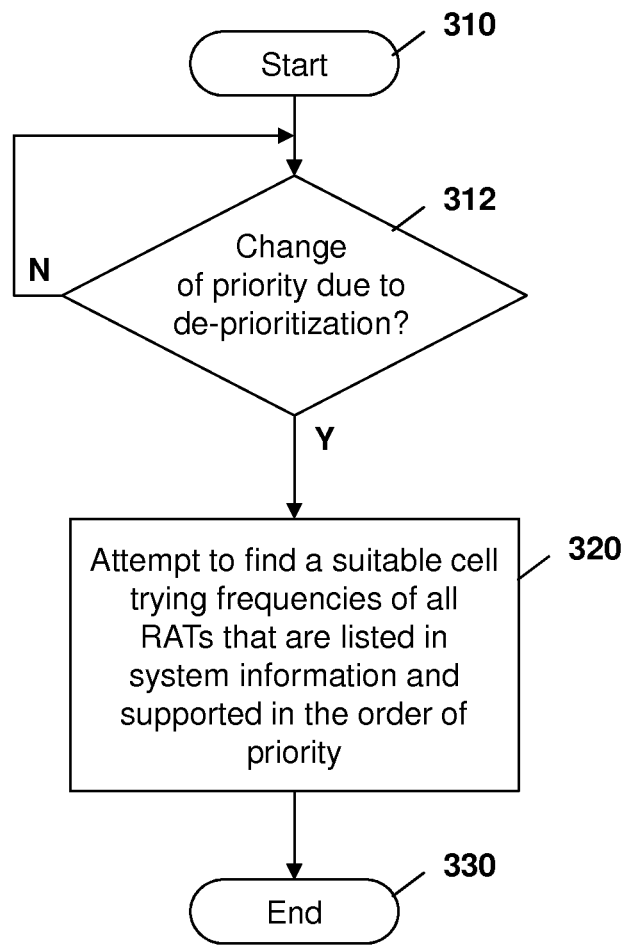
FIG. 3 is a flow diagram showing an attempt at a user equipment to find suitable cells when a change of priority due to de-prioritization is made.

Reference is now made to FIG. 3. The process of FIG. 3 starts at block 310 and proceeds to block 312 in which the UE checks whether a change of priority due to a de-prioritization has occurred. If not, the process continues to loop back to block 312.

Once a change of priority due to de-prioritization has occurred, the process proceeds to block 320 in which the UE regularly attempts to find suitable cells, trying frequencies of all RATs that are listed in system information and supported in the order of absolute priority for a certain period while performing necessary measurement for the cell reselection evaluation.

The process then proceeds from block 320 to block 330 and ends.

Thus, in accordance with the embodiments above, fast reselection may occur by finding suitable cells on frequencies listed in system information in accordance with FIGS. 1 to 3 above.

Handling of De-Prioritization Upon PLMN Change

In a further embodiment, the UE may discard stored de-prioritization requests and stop the timer T325 upon PLMN change or selection. Alternatively, the UE may suspend the

TABLE 5

Section 5.2.4.1 Reselection Priorities Handling

Section 5.2.4.1 Reselection Priorities Handling
Absolute priorities of different E-UTRAN frequencies or inter-RAT frequencies may be provided to the UE in the system information, in the RRCConnectionRelease message, or by inheriting from another RAT at inter-RAT cell (re)selection. In the case of system information, an E-UTRAN frequency or inter-RAT frequency may be listed without providing a priority (i.e. the field cellReselectionPriority is absent for that frequency). If priorities are provided in dedicated signalling, the UE shall ignore all the priorities provided in system information. If UE is in camped on any cell state, UE shall only apply the priorities provided by system information from current cell, and the UE preserves priorities provided by dedicated signalling unless specified otherwise. When the UE in camped normally state, has only dedicated priorities other than for the current frequency, the UE shall consider the current frequency to be the lowest priority frequency (i.e. lower than the eight network configured values). While the UE is camped on a suitable CSG cell, the UE shall always consider the current frequency to be the highest priority frequency (i.e. higher than the eight network configured values), irrespective of any other priority value allocated to this frequency. If the UE is receiving or interested to receive an MBMS service and can only receive this MBMS service while camping on a frequency on which it is provided, the UE may consider that frequency to be the highest priority during the MBMS session [2] as long as it reselects cells broadcasting SIB13 and as long as:
    SIB15 of the serving cell indicates for that frequency one or more MBMS SAIs
    included in the MBMS User Service Description (USD) [22] of this service; or
    SIB15 is not broadcast in the serving cell and that frequency is included in the
    USD of this service.
  NOTE: The UE considers that the MBMS session is ongoing using the session
      start and end times as provided by upper layers in the USD i.e. the UE
      does not verify if the session is indicated on MCCH.
In case UE receives RRCConnectionReject with deprioritisationReq, UE shall consider current carrier frequency and stored frequencies due to the previously received RRCConnectionReject with deprioritisationReq or all the frequencies of EUTRA to be the lowest priority frequency (i.e. lower than the eight network configured values) while T325 is running irrespective of camped RAT.
Upon the change of priority due to de-prioritization, the UE should start regularly attempt to find a suitable cell trying frequencies of all RATs that are listed in system information and supported by the in order of priority for certain period while performing cell reselection evaluation.

de-prioritization request or requests and keep the T325 timer running upon PLMN change, considering the possibility of going back to the previous PLMN in the near future.

However, in one embodiment, when the radio access network (RAN) is shared by the old PLMN which requested the de-prioritization and the new PLMN, the UE may maintain the de-prioritization request and keep the T325 timer running, considering the possibility that the evolved Node B (eNB) is still congested on that radio access network.

Upon reception of a de-prioritization request, the UE may store one or more PLMN identities that have been read from the broadcast system information of the cell or the identity of registered or selected PLMN with the de-prioritization request. Upon selection of a PLMN, if the newly selected PLMN is one of the stored PLMN identities, the UE may maintain the de-prioritization request and the T325 timer. Upon selection of a PLMN, if the newly selected PLMN is not one of the stored PLMN identities, the UE may release the de-prioritization request and stop the T325 timer or suspend the de-prioritization request and keep the T325 timer running.

The above may be applicable, for example, to cases where the E-UTRA or LTE RAT is de-prioritized, or in another cases where one or more frequencies are de-prioritized and are the only LTE frequencies available and supported by the UE in the new PLMN, thus effectively de-prioritizing LTE RAT.

For example, in a country border scenario where the same frequency may be used by multiple PLMNs, the above may be applicable to a case where a single frequency or an entire RAT is de-prioritized.

In one embodiment, the UE may release the de-prioritization request (all or some of the de-prioritization requests depending on the new PLMN and stored PLMN(s) if multiple de-prioritization requests have been received) and stop the T325 timer or suspend the de-prioritization request (all or some of de-prioritization requests depending on the new PLMN and stored PLMN(s) if multiple de-prioritization requests have been received) and keep the T325 timer running when the UE camps on a suitable cell of the new PLMN selected and location registration is successful in the new PLMN. However, in some instances the UE may be trying to find a suitable cell of the new PLMN selected or in camps on an Any Cell state within the newly selected PLMN which is not a home PLMN or an equivalent PLMN. In this case, the UE may maintain or suspend the de-prioritization request for the T325 timer.

In order to support the decision whether de-prioritization should be maintained, removed, suspended or resumed upon PLMN selection, upon receiving a de-prioritization request the UE may store a list of PLMN identities broadcast in a SystemInformationBlockType1 or the PLMN identity of the registered or selected PLMN with the de-prioritization request. For example, section 5.3.3.8 of the 3GPP TS 36.331 Specification may be amended in accordance with Table 6 below.

TABLE 6

Section 5.3.3.8 Reception of the RRCConnectionReject by the UE 5.3.3.8 Reception of the RRCConnectionReject by the UE
The UE shall:
    1> stop timer T300;
    1> reset MAC and release the MAC configuration;
    1> start timer T302, with the timer value set to the waitTime;
    1> if the extendedWaitTime is present and the UE supports delay tolerant access;
        2> forward the extendedWaitTime to upper layers;
    1> if deprioritisationTimer is included:
        2> start or restart timer t325 with the timer value set to the deprioritisationTimer signalled;
    1> store the deprioritisationReq and plmn-IdentityList received in SystemInformationBlockType1 of the current cell or the identity of selected or registered PLMN if deprioritisationReq is present, until t325 expiry, irrespective of any other cell reselection absolute priority assignments (by dedicated or common signalling), or RRC Connections in E-UTRAN or other RATs;
    1> inform upper layers about the failure to establish the RRC connection and that access barring for mobile originating calls, mobile originating signalling, mobile terminating access and mobile originating CS fallback is applicable, upon which the procedure ends;

As seen in the bold section of Table 6 above, the storing of the de-prioritization request includes storing a PLMN identity list received in SystemInformationBlockType1 of the current cell or the identity of the selected or registered PLMN upon reception of the de-prioritization request. By storing the PLMN identity list or registered or selected PLMN upon reception of a de-prioritization request, the UE can identify whether, (1) a new PLMN selected is shared or not shared with the PLMN that received the de-prioritization request or (2) the new PLMN selected is the same or different than that received with the de-prioritization request.

Further, UE behavior upon PLMN selection may be realized by changes in Section 5.2.4.1 of the 3GPP TS 36.304 Specification, as shown by Table 7 below. Removal or suspension of the de-prioritizationReq may be indicated in the de-prioritizationReq carried by the RRC ConnectionReject.

TABLE 7

Section 5.2.4.1 Reselection priorities handling

Section 5.2.4.1 Reselection priorities handling
Absolute priorities of different E-UTRAN frequencies or inter-RAT frequencies may be provided to the UE in the system information, in the RRCConnectionRelease message, or by inheriting from another RAT at inter-RAT cell (re)selection. In the case of system information, an E-UTRAN frequency or inter-RAT frequency may be listed without providing a priority (i.e. the field cellReselectionPriority is absent for that frequency). If priorities are provided in dedicated signalling, the UE shall ignore all the priorities provided in system information. If UE is in camped on any cell state, UE shall only apply the priorities provided by system information from current cell, and the UE preserves priorities provided by dedicated signalling unless specified otherwise. When the UE in camped normally state, has only dedicated priorities other than for the current frequency, the UE shall consider the current frequency to be the lowest priority frequency (i.e. lower than the eight network configured values). While the UE is camped on a suitable CSG cell, the UE shall always consider the current frequency to be the highest priority frequency (i.e. higher than the eight network configured values), irrespective of any other priority value allocated to this frequency. If the UE is receiving or interested to receive an MBMS service and can only receive TABLE 7-continued Section 5.2.4.1 Reselection priorities handling this MBMS service while camping on a frequency on which it is provided, the UE may
consider that frequency to be the highest priority during the MBMS session [2] as
long as it reselects cells broadcasting SIB13 and as long as:
    SIB15 of the serving cell indicates for that frequency one or more MBMS SAIs
    included in the MBMS User Service Description (USD) [22] of this service; or
    SIB15 is not broadcast in the serving cell and that frequency is included in the
    USD of this service.
  NOTE: The UE considers that the MBMS session is ongoing using the session
        start and end times as provided by upper layers in the USD i.e. the UE
        does not verify if the session is indicated on MCCH.
In case UE receives RRCConnectionReject with deprioritisationReq, UE shall
consider current carrier frequency and stored frequencies due to the previously
received RRCConnectionReject with deprioritisationReq or all the frequencies of
EUTRA to be the lowest priority frequency (i.e. lower than the eight network
configured values) while T325 is running irrespective of camped RAT.
The UE shall remove deprioritisationReq and stop T325 when:
(Alternatively) The UE shall suspend deprioritisationReq and keep T325
running when:
    PLMN selection is performed on request by NAS; and
    a suitable cell is found in the selected PLMN and location registration is
    successful;
    the identity of the (registered) PLMN is not included in the plmn-
    IdentityList(s) stored or identity of the (registered) PLMN is not equal with
    the identity of the PLMN(s) stored.

As seen in the example of Table 7 above, the UE may remove the de-prioritization request (all or some of de-prioritization requests depending on the new PLMN and stored PLMN(s) if multiple de-prioritization requests have been received) and stop the T325 timer when: the PLMN selection is performed on request by the network access stratum (NAS); the UE finds a suitable cell of the selected PLMN and complete location registration successfully; and the (now registered) PLMN is not included in the PLMN(s) stored when de-prioritization request(s) was received (i.e. the stored PLMN identity list(s) or stored identity of registered or selected PLMN(s)).

In an alternative embodiment, instead of stopping the T325 timer the T325 timer may be kept running and the de-prioritization request may be just simply suspended instead of removed.

Figure 4:
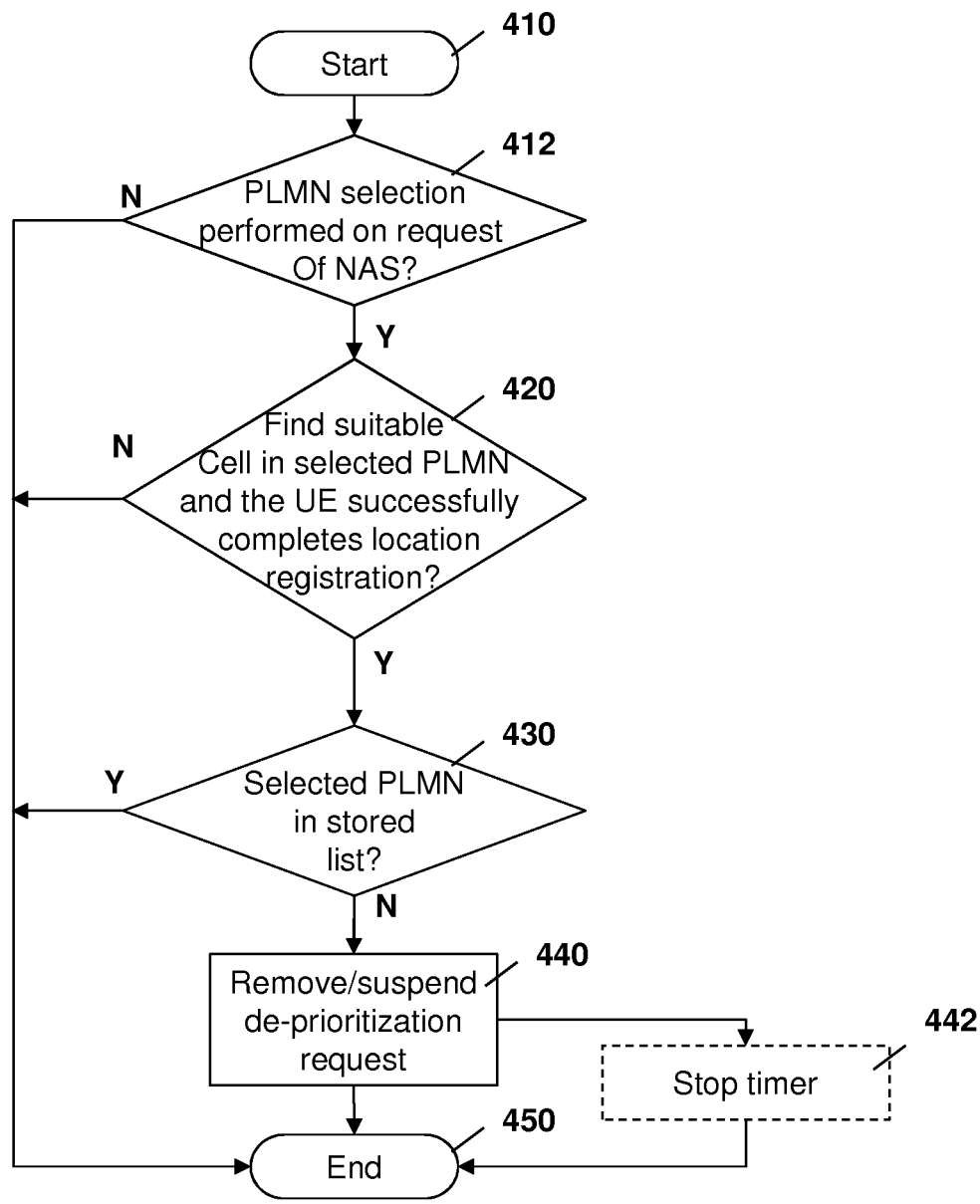
FIG. 4 is a flow diagram showing an example removal or suspension of a de-prioritization request.

Reference is now made to FIG. 4. The process of FIG. 4 starts at block 410 and proceeds to block 412 in which a check is made to determine whether a PLMN selection at the UE is performed at the request of the NAS.

If yes, the process proceeds to block 420 in which a check is made to determine whether the UE can find a suitable cell in the selected PLMN and the UE successfully completes location registration.

If yes, the process proceeds to block 430 in which the UE checks whether or not the new PLMN is one of any stored PLMN(s) with de-prioritization request(s); that is, whether or not the new PLMN is in a PLMN list stored when a de-prioritization request was received or is the selected or registered PLMN stored when the de-prioritization request was received. If the check at block 430 finds the new PLMN is not one of any stored PLMN(s) with de-prioritization request(s), then the process proceeds to block 440 in which the de-prioritization request is either removed or suspended.

From block 440 the process optionally may proceed to block 442 in which the timer T325 may be stopped in accordance with the embodiments described above. From block 440, if the timer is not stopped, or from block 442, the proceeds then proceeds to block 450 and ends.

Further, from blocks 412, 420, if the check is negative, or from block 430 if it is determined the selected PLMN is in the stored list, the process proceeds to block 450 and ends.

If, rather than stopping the timer and removing the de-prioritization, the process suspends the de-prioritization and allows the timer to continue, then a way to resume the de-prioritization may be added. Reference is now made to Table 8 below, which shows example changes to the 3GPP TS 36.304 Specification:

TABLE 8

Section 5.2.4.1 Reselection priorities handling

Section 5.2.4.1 Reselection priorities handling
Absolute priorities of different E-UTRAN frequencies or inter-RAT frequencies may
be provided to the UE in the system information, in the RRCConnectionRelease
message, or by inheriting from another RAT at inter-RAT cell (re)selection. In the
case of system information, an E-UTRAN frequency or inter-RAT frequency may be
listed without providing a priority (i.e. the field cellReselectionPriority is absent for that
frequency). If priorities are provided in dedicated signalling, the UE shall ignore all
the priorities provided in system information. If UE is in camped on any cell state, UE
shall only apply the priorities provided by system information from current cell, and
the UE preserves priorities provided by dedicated signalling unless specified
otherwise. When the UE in camped normally state, has only dedicated priorities other
than for the current frequency, the UE shall consider the current frequency to be the
lowest priority frequency (i.e. lower than the eight network configured values). While
the UE is camped on a suitable CSG cell, the UE shall always consider the current
frequency to be the highest priority frequency (i.e. higher than the eight network
configured values), irrespective of any other priority value allocated to this frequency.

TABLE 8-continued

Section 5.2.4.1 Reselection priorities handling

If the UE is receiving or interested to receive an MBMS service and can only receive
this MBMS service while camping on a frequency on which it is provided, the UE may
consider that frequency to be the highest priority during the MBMS session [2] as
long as the reselected cell is broadcasting SIB13 and as long as:
    SIB15 of the serving cell indicates for that frequency one or more MBMS SAIs
    included in the MBMS User Service Description (USD) [22] of this service; or
    SIB15 is not broadcast in the serving cell and that frequency is included in the
    USD of this service.
    NOTE:    The UE considers that the MBMS session is ongoing using the session
        start and end times as provided by upper layers in the USD i.e. the UE
        does not verify if the session is indicated on MCCH.
In case UE receives RRCConnectionReject with deprioritisationReq, UE shall
consider current carrier frequency and stored frequencies due to the previously
received RRCConnectionReject with deprioritisationReq or all the frequencies of
EUTRA to be the lowest priority frequency (i.e. lower than the eight network
configured values) while T325 is running irrespective of camped RAT.
    NOTE:    UE should search for a higher priority layer for cell reselection as soon as
        possible after the change of priority. The minimum related performance
        requirements specified in TS 36.133 [10] are still applicable.
The UE shall suspend application of a deprioritisationReq when:
    A PLMN selection is performed on request by NAS [5]; and
    A suitable cell is found in the selected PLMN and location registration is
        successful; and
    The identify of the (registered) PLMN is not included in plmn-
        IdentityList(s) stored or the identity of the (registered) PLMN selected
        is not equal to the identity of the stored PLMN(s).
The UE shall resume application of a deprioritisationReq when:
    De-prioritization request is suspended; and
    A PLMN selection is performed on request by NAS; and
    A suitable cell is found in the selected PLMN and location registration is
        successful; and
    The identity of the (registered) PLMN is included in plmn-IdentityList(s)
        stored or the identity of the (registered) PLMN is not equal with the
        identity of the stored PLMN(s).

As seen in Table 8 above, if the UE returns to an old PLMN from which de-prioritization request was received or one of the PLMN which shares radio access network or core network with the old PLMN while de-prioritization request is being suspended then the application of the derprioritisationReq is resumed.

Specifically, if the UE returns to the old PLMN based on a selection performed on the request of the NAS, and a suitable cell is found and registration is successful in the PLMN, and the PLMN is one of the stored PLMN(s) with the de-prioritization request (meaning the UE is returning to the old PLMN in that de-prioritization request was received or a PLMN whose network is shared by the old PLMN), then the UE can resume application of the de-prioritization (all or some of de-prioritization requests depending on the new PLMN and stored PLMN(s) if multiple de-prioritization requests have been received).

Handling a Conflict with CSG Cell Priority

In one embodiment, in order to handle the de-prioritization of a CSG frequency, a CSG cell may reject an RRC connection request with a de-prioritization request when the network wants to de-prioritize the current frequency or the RAT completely even for CSG cell, not leaving it up to UE behavior.

Upon reception of the request, the UE may store that the de-prioritization request was received in a CSG cell, and start applying de-prioritization even to CSG cells on that frequency or E-UTRA depending on the type of de-prioritization request as long as the T325 timer is running. In one embodiment, the UE may start or restart the T325 timer or continue the T325 timer.

Thus, upon reception of a de-prioritization request from a CSG cell, the UE stores a "CSG-De-prioritization-Indication" in addition to de-prioritizationReq and PLMN-identity list or identity of selected or registered PLMN. If the CSG-De-prioritization-Indication is stored, the UE applies de-prioritization to a frequency on which a suitable CSG cell is detected. If the CSG-De-prioritization-Indication is not stored, the UE may reselect to the CSG cell.

Figure 5:
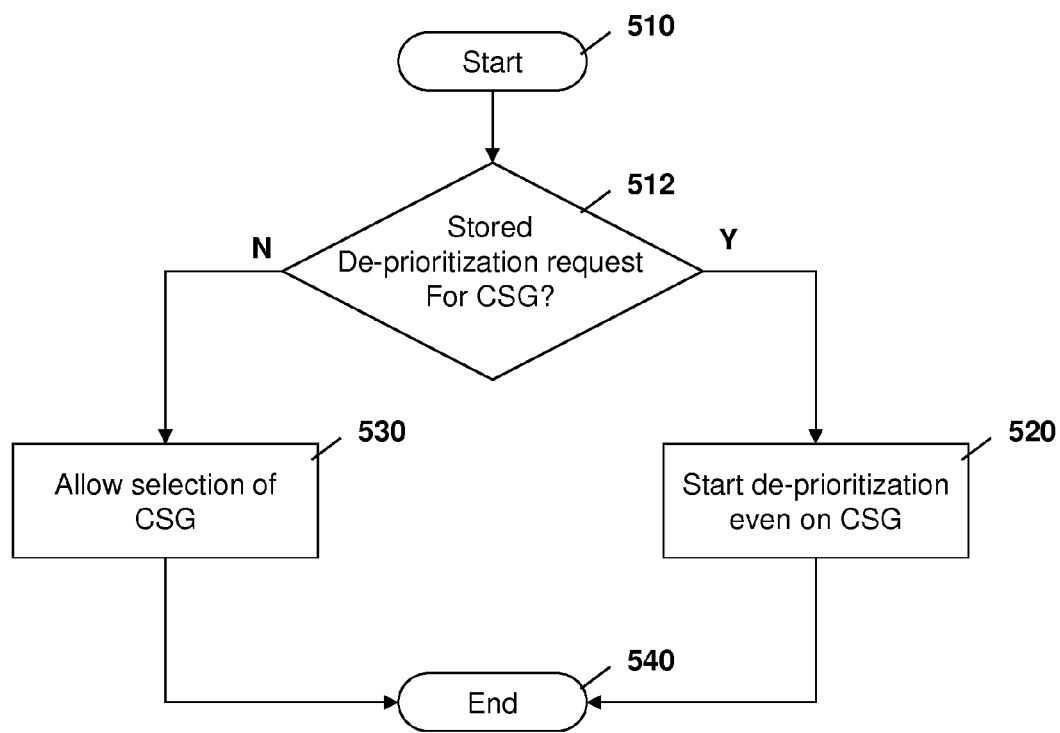
FIG. 5 is a flow diagram showing an example for resolving conflict for a closed subscriber group using a de-prioritized frequency.

Reference is now made to FIG. 5. The process of FIG. 5 starts at block 510 and proceeds to block 512 in which a check is made to determine whether or not a de-prioritization request has been received from a CSG cell and stored at the UE.

If the check at block 512 finds a de-prioritization request has been received from a CSG cell, the process then proceeds to block 520 in which the UE applies de-prioritization to a frequency on which a suitable CSG cell is detected.

Conversely, from block 512 if a de-prioritization request has not been received from a CSG cell then the process proceeds to block 530 in which the UE does not apply de-prioritization to a frequency on which a suitable CSG cell is detected.

From blocks 520 and 530 the process proceeds to block 540 and ends.

With regard to a further embodiment, if in RRC connected mode, the UE may indicate to the CSG cell whether the UE has stored a de-prioritization request for the current frequency or RAT or the UE may indicate a request for measurement configuration of other frequencies or RATs which are not de-prioritized.

Upon reception of such indication, the CSG cell may configure inter-frequency or inter-RAT measurements according to UE capabilities and the information provided. Thus, for example, the CSG cell may configure measurements on frequencies that are not de-prioritized, or for a different RAT for better handover decisions to avoid de-prioritized frequencies.

In one embodiment, the indication from the UE may contain a list of de-prioritized frequencies or RATs.

In one embodiment, the request to the CSG cell to configure measurements of a frequency or RAT which is not de-prioritized may be indicated by providing a list of de-prioritized frequencies or RATs in the RRCConnectionConfigurationComplete message for the case of in-bound handover to a CSG cell and RRCConnectionSetupComplete messages for the case of setting up a new connection in a CSG cell. The UE may include a list of de-prioritized frequencies or RAT(s) in a message when the UE does not have measurement configurations for not de-prioritized frequencies in response to a measurement configuration request from the CSG cell.

Figure 6:
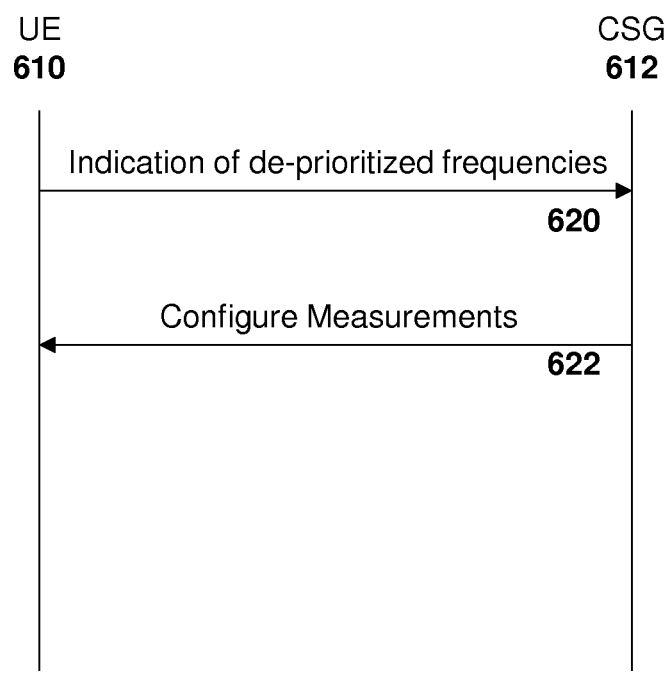
FIG. 6 is a data flow diagram showing signaling of frequencies from a UE to a closed subscriber group and configuration of measurements on the UE.

Reference is now made to FIG. 6, which shows a UE 610 communicating with a CSG cell 612. As seen in the embodiment of FIG. 6, UE 610 provides an indication of de-prioritized frequencies in the message of arrow 620. As indicated above, the message may be an RRCConnectionConfigurationComplete or an RRCConnectionSetupComplete message and the indication may be a list of de-prioritized frequencies or RATs. Alternatively a single bit may indicate that the current frequency or RAT is de-prioritized.

Upon receiving the message of arrow 620, CSG 612 then can configure inter-RAT or intra-RAT measurements based on UE capabilities and provide such a measurement configuration to the UE, as shown by arrow 622. The measurement configuration may be contained in a RRCConnectionReconfiguration message.

In a further embodiment, with regard to the re-entering of a macro cell from a CSG cell, when an idle mode UE enters a CSG cell from a macro cell that has de-prioritized the CSG frequency, the UE can keep the T325 timer running but consider the frequency as the highest priority. While the T325 timer is running, if the UE leaves the CSG cell, it re-configures the de-prioritized frequency as the lowest one.

In order to reselect to other frequencies or RATs as quickly as possible, the UE may regularly attempt to find suitable cells on frequencies listed in system information and supported by the UE in an order from high priority to low priority in addition to performing necessary measurements for the cell reselection procedure as described above if the serving CSG cell becomes unsuitable and if the serving frequency is being de-prioritized. Alternatively the UE may regularly attempt to find suitable cells in order of priority as described above with regard to FIGS. 1 to 3.

Connected Mode UE Handling

In a further embodiment, in order to provide for de-prioritization for connected mode and to keep UEs from reselecting de-prioritized frequencies or RATs when they are back to IDLE mode, the network may indicate the de-prioritization request and the associated timer in an RRC Connection Release message.

In the case of radio link failure, most likely the UE will find a suitable cell on the frequency on which the radio link failure is detected. If the frequency or radio access technology is congested, the network may reject the re-establishment request and indicate the de-prioritization request.

A de-prioritized frequency or RAT may not be considered in a cell selection process. Therefore, the UE may select a de-prioritized frequency or RAT in cell selection upon receiving an RRC Connection Release or RRC Reestablishment Reject. Then the UE may reselect to other frequencies.

The selection of the de-prioritized frequency may happen frequently since a UE usually selects a cell on a frequency which was used in a connected mode. In order to avoid such case, the UE may consider the de-prioritized frequencies or RAT(s) in the last place in a cell selection process.

Thus, on idle mode transition, a UE may consider all de-prioritized frequencies to be the lowest priority frequency while the T325 timer is running, irrespective of camped RAT.

In order to consider de-prioritized frequencies or RATs in a cell selection upon returning to idle mode, the UE may consider the de-prioritized frequencies or RATs as the last candidate in cell selection process. The exclusion may be implemented through changes to Section 5.2.7 of the 3GPP TS 36.304 Specification. Reference is now made to Table 9 below.

TABLE 9

5.2.7 Cell Selection when leaving RRC_CONNECTED state 5.2.7 Cell Selection when leaving RRC_CONNECTED state
On transition from RRC_CONNECTED to RRC_IDLE, UE shall attempt
to camp on a suitable cell according to redirectedCarrierInfo, if included in
the RRCConnectionRelease message. If the UE cannot find a suitable cell,
the UE is allowed to camp on any suitable cell of the indicated RAT.
**Within the indicated RAT the UE shall camp on a suitable cell of a non
de-prioritized frequency in preference to a suitable cell of a de-
prioritized frequency.** If the RRCConnectionRelease message does not
contain the redirectedCarrierInfo UE shall attempt to select a suitable cell
on an EUTRA carrier **which is not de-prioritized unless EUTRA
is de-prioritized**. If no suitable cell is found according to the above, the UE
shall perform a cell selection starting with Stored Information Cell
Selection procedure in order to find a suitable cell to camp on.
When returning to RRC_IDLE after UE moved to RRC_CONNECTED state
from camped on any cell state, UE shall attempt to camp on an acceptable
cell according to redirectedCarrierInfo, if included in the
RRCConnectionRelease message. If the UE cannot find an acceptable cell,
the UE is allowed to camp on any acceptable cell of the indicated RAT. If
the RRCConnectionRelease message does not contain
redirectedCarrierInfo UE shall attempt to select an acceptable cell on an
EUTRA carrier. If no acceptable cell is found according to the above, the
UE shall continue to search for an acceptable cell of any PLMN in state
any cell selection.

Thus, as seen in Table 9 above, the bold section has been added and indicates that within an indicated RAT the UE shall camp on a suitable cell of a non-de-prioritized frequency in preference to a suitable cell of a de-prioritized frequency.

In particular, pursuant to the text added in Table 9, a connected mode UE could receive a message when leaving the connected state providing an indication of frequencies which are de-prioritized and the UE should attempt to find a suitable cell on non de-prioritized frequencies prior to camping on de-prioritized frequencies.

Cancellation of De-Prioritization Request

In one embodiment, dedicated signalling from a network element may indicate cancellation of de-prioritization of a frequency. In other embodiment, the UE may decide whether de-prioritization should be cancelled by measuring a de-prioritized frequency.

Specifically, after receiving an RRC connection reject with a de-prioritization request, the UE may reselect other frequencies or RATs and establish a connection.

After entering a connected mode on that other frequency or RAT, the network may handover the UE back to the de-prioritized frequency or RAT if the network knows that a congestion problem no longer exists. In the handover command or RRC Connection Reconfiguration message the network may indicate a cancellation of a de-prioritization request.

In a further embodiment, the network may redirect the UE to the de-prioritized frequency or RAT if the network knows that congestion problem no longer exists. In the RRC Connection Release message, containing the redirection, the network may indicate cancellation of the de-prioritization request.

In one embodiment, the network may indicate whether the UE may release, continue or set-up a de-prioritization request. The de-prioritization request may be extended to include a definition for release, continue, or set-up. Reference is now made to Table 10.

congested nodes and nodes which accept UEs from de-prioritized frequency or RAT, which may be unavailable in some cases.

Alternatively, the UE may be provided a Received Signal Strength Indicator (RSSI) threshold upon RRC connection reject with a de-prioritization request. The RSSI may indicate system loading level and if the system is congested the RSSI may be higher. Thus, the UE may measure the RSSI of the de-prioritized frequency or RAT and if the measurement or averaged measurement over a certain period is less than the threshold, the UE may cancel the stored de-prioritization request and stop T325 timer.

Thus, the de-prioritization request may be extended to have an RSSI threshold so that the UE may decide whether the de-prioritization is still applicable to each de-prioritization frequency if the RSSI measurement of the best cell on each frequency in terms of RSRP or path loss is less than the RSSI threshold as provided above in Table 10.

The above therefore provides for enhancements to de-prioritization requests between a network element and a UE.

The above may be implemented by any network element. A simplified network element is shown with regard to FIG. 7.

Figure 7:
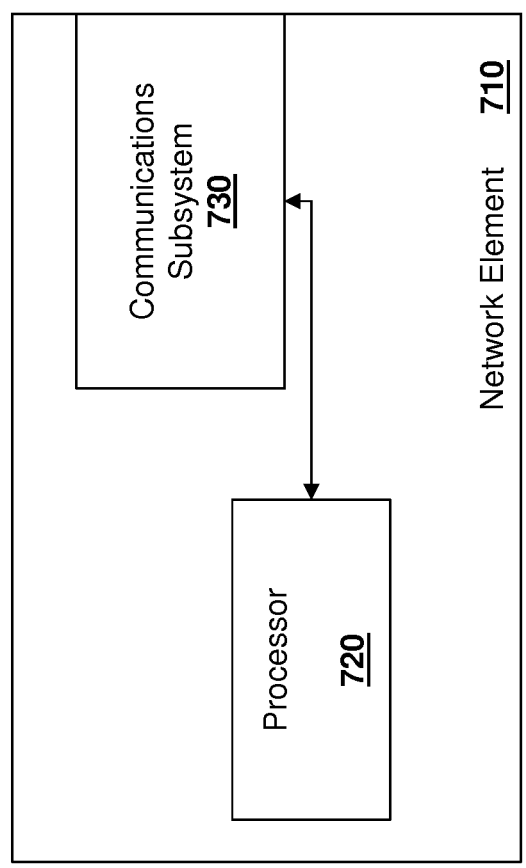
FIG. 7 is a simplified block diagram of an example network element.

In FIG. 7, network element 710 includes a processor 720 and a communications subsystem 730, where the processor 720 and communications subsystem 730 cooperate to perform the methods described above.

Further, the above may be implemented by any UE. One exemplary device is described below with regard to FIG. 8.

UE 800 is typically a two-way wireless communication device having voice and data communication capabilities. UE 800 generally has the capability to communicate with other computer systems on the Internet. Depending on the exact functionality provided, the UE may be referred to as a data messaging device, a two-way pager, a wireless e-mail device, a cellular telephone with data messaging capabilities, a wireless Internet appliance, a wireless device, a mobile device, or a data communication device, as examples.

TABLE 10 deprioritisationReq Information Element

```
deprioritisationReq-r11    CHOICE {
    release                              NULL,
    continue                             NULL,
    setup                                SEQUNECE {
      deprioType          ENUMERATED {frequency, e-utra},
      deprioritisationTimer-r11    ENUMERATED {min5, min10, min15, min30},
      rssi-Threshold                     INTEGER (0..64) OPTIONAL,
      rssi-Duration                      INTEGER (1..16) OPTIONAL
    }
}
```

As seen in bold in Table 10, the additional elements added on top of what is currently in the 3GPP TS 36.331 Specifications provides for an indication for release, continuation or set-up of the de-prioritization request.

The information element in Table 10 above may be included in the RRCConnectionSetup, RRCConnectionReconfiguration, RRCConnectionRe-establishmentReject and RRCConnectionRelease messages in one embodiment.

In cases where a network does not reject a request for an RRC Connection on a frequency that has been de-prioritized, in some embodiments an RRC Connection Setup message may indicate if the UE should remove, continue or renew de-prioritization requests. In some embodiments, solutions described above may require network coordination between Where UE 800 is enabled for two-way communication, it may incorporate a communication subsystem 811, including both a receiver 812 and a transmitter 814, as well as associated components such as one or more antenna elements 816 and 818, local oscillators (LOs) 813, and a processing module such as a digital signal processor (DSP) 820. As will be apparent to those skilled in the field of communications, the particular design of the communication subsystem 811 will be dependent upon the communication network in which the device is intended to operate.

Network access requirements will also vary depending upon the type of network 819. In some networks network access is associated with a subscriber or user of UE 800. A UE may require a removable user identity module (RUIM) or a subscriber identity module (SIM) card, for example. The SIM/RUIM interface 844 is normally similar to a card-slot into which a SIM/RUIM card can be inserted and ejected. The SIM/RUIM card can have memory and hold many key configurations 851, and other information 853 such as identification, and subscriber related information.

Figure 8:
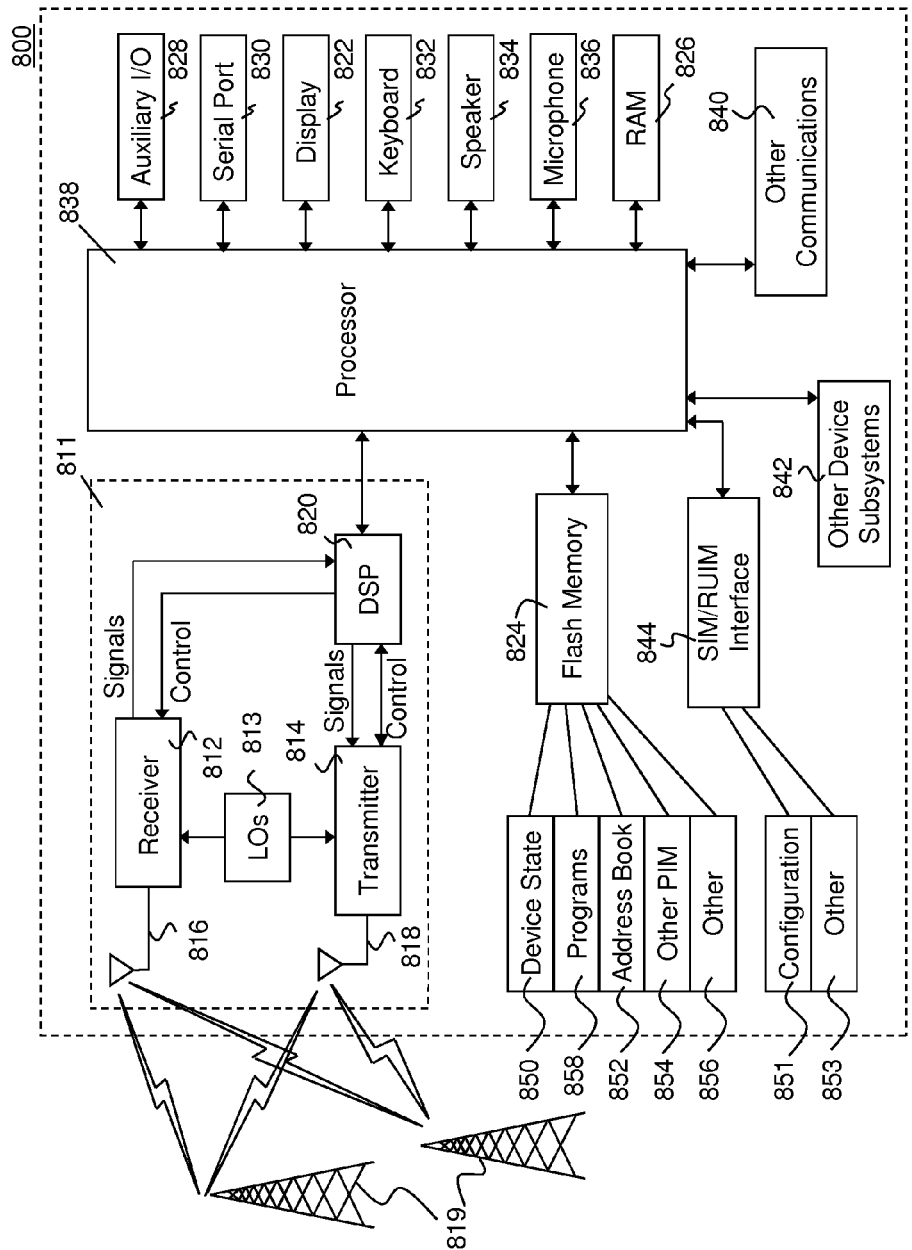
FIG. 8 is a block diagram of an example user equipment.

When required network registration or activation procedures have been completed, UE 800 may send and receive communication signals over the network 819. As illustrated in FIG. 8, network 819 can consist of multiple base stations communicating with the UE.

Signals received by antenna 816 through communication network 819 are input to receiver 812, which may perform such common receiver functions as signal amplification, frequency down conversion, filtering, channel selection and the like. A/D conversion of a received signal allows more complex communication functions such as demodulation and decoding to be performed in the DSP 820. In a similar manner, signals to be transmitted are processed, including modulation and encoding for example, by DSP 820 and input to transmitter 814 for digital to analog conversion, frequency up conversion, filtering, amplification and transmission over the communication network 819 via antenna 818. DSP 820 not only processes communication signals, but also provides for receiver and transmitter control. For example, the gains applied to communication signals in receiver 812 and transmitter 814 may be adaptively controlled through automatic gain control algorithms implemented in DSP 820.

UE 800 generally includes a processor 838 which controls the overall operation of the device. Communication functions, including data and voice communications, are performed through communication subsystem 811. Processor 838 also interacts with further device subsystems such as the display 822, flash memory 824, random access memory (RAM) 826, auxiliary input/output (I/O) subsystems 828, serial port 830, one or more keyboards or keypads 832, speaker 834, microphone 836, other communication subsystem 840 such as a short-range communications subsystem and any other device subsystems generally designated as 842. Serial port 830 could include a USB port or other port known to those in the art.

Some of the subsystems shown in FIG. 8 perform communication-related functions, whereas other subsystems may provide "resident" or on-device functions. Notably, some subsystems, such as keyboard 832 and display 822, for example, may be used for both communication-related functions, such as entering a text message for transmission over a communication network, and device-resident functions such as a calculator or task list.

Operating system software used by the processor 838 may be stored in a persistent store such as flash memory 824, which may instead be a read-only memory (ROM) or similar storage element (not shown). Those skilled in the art will appreciate that the operating system, specific device applications, or parts thereof, may be temporarily loaded into a volatile memory such as RAM 826. Received communication signals may also be stored in RAM 826.

As shown, flash memory 824 can be segregated into different areas for both computer programs 858 and program data storage 850, 852, 854 and 856. These different storage types indicate that each program can allocate a portion of flash memory 824 for their own data storage requirements. Processor 838, in addition to its operating system functions, may enable execution of software applications on the UE. A predetermined set of applications that control basic operations, including at least data and voice communication applications for example, will normally be installed on UE 800 during manufacturing. Other applications could be installed subsequently or dynamically.

Applications and software may be stored on any computer readable storage medium. The computer readable storage medium may be a tangible or in transitory/non-transitory medium such as optical (e.g., CD, DVD, etc.), magnetic (e.g., tape) or other memory known in the art.

One software application may be a personal information manager (PIM) application having the ability to organize and manage data items relating to the user of the UE such as, but not limited to, e-mail, calendar events, voice mails, appointments, and task items. Naturally, one or more memory stores would be available on the UE to facilitate storage of PIM data items. Such PIM application may have the ability to send and receive data items, via the wireless network 819. Further applications may also be loaded onto the UE 800 through the network 819, an auxiliary I/O subsystem 828, serial port 830, short-range communications subsystem 840 or any other suitable subsystem 842, and installed by a user in the RAM 826 or a non-volatile store (not shown) for execution by the processor 838. Such flexibility in application installation increases the functionality of the device and may provide enhanced on-device functions, communication-related functions, or both. For example, secure communication applications may enable electronic commerce functions and other such financial transactions to be performed using the UE 800.

In a data communication mode, a received signal such as a text message or web page download will be processed by the communication subsystem 811 and input to the processor 838, which may further process the received signal for output to the display 822, or alternatively to an auxiliary I/O device 828.

A user of UE 800 may also compose data items such as email messages for example, using the keyboard 832, which may be a complete alphanumeric keyboard or telephone-type keypad, among others, in conjunction with the display 822 and possibly an auxiliary I/O device 828. Such composed items may then be transmitted over a communication network through the communication subsystem 811.

For voice communications, overall operation of UE 800 is similar, except that received signals would typically be output to a speaker 834 and signals for transmission would be generated by a microphone 836. Alternative voice or audio I/O subsystems, such as a voice message recording subsystem, may also be implemented on UE 800. Although voice or audio signal output is generally accomplished primarily through the speaker 834, display 822 may also be used to provide an indication of the identity of a calling party, the duration of a voice call, or other voice call related information for example.

Serial port 830 in FIG. 8 would normally be implemented in a personal digital assistant (PDA)-type UE for which synchronization with a user's desktop computer (not shown) may be desirable, but is an optional device component. Such a port 830 would enable a user to set preferences through an external device or software application and would extend the capabilities of UE 800 by providing for information or software downloads to UE 800 other than through a wireless communication network. The alternate download path may for example be used to load an encryption key onto the device through a direct and thus reliable and trusted connection to thereby enable secure device communication. As will be appreciated by those skilled in the art, serial port 830 can further be used to connect the UE to a computer to act as a modem.

Other communications subsystems 840, such as a short-range communications subsystem, is a further optional component which may provide for communication between UE 800 and different systems or devices, which need not necessarily be similar devices. For example, the subsystem 840 may include an infrared device and associated circuits and components or a Bluetooth™ communication module to provide for communication with similarly enabled systems and devices. Subsystem 840 may further include non-cellular communications such as WiFi or WiMAX, or near field communications (NFC).

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A method at a user equipment comprising:
storing a de-prioritization request; and
removing or suspending the de-prioritization request at the user equipment upon selection of a public land mobile network at the user equipment.

2. The method of claim 1, further comprising storing a public land mobile network identity of the public land mobile network requesting the de-prioritization with the de-prioritization request.

3. The method of claim 2, wherein the public land mobile network identity is received in a system information message at the user equipment.

4. The method of claim 1, wherein the method further comprises, prior to the removing or suspending, determining that the selection of the public land mobile network is performed on the request of a non-access stratum.

5. The method of claim 2, further comprising storing a list of public land mobile network identities associated with the public land mobile network identity stored with the de-prioritization request.

6. The method of claim 5, wherein the list is limited to identities of public land mobile networks sharing a radio network with the public land mobile network requesting the de-prioritization.

7. The method of claim 5, wherein the method further comprises, prior to the removing or suspending, determining that the selected public land mobile network has an identity outside of the list of public land mobile network identities.

8. The method of claim 1, wherein the method further comprises, prior to the removing or suspending, determining that the user equipment is able to find a suitable cell in the selected public land mobile network.

9. The method of claim 1, further comprising stopping a timer for the de-prioritization request after the removing or suspending.

10. The method of claim 1, further comprising allowing a timer for the de-prioritization request to keep running after the suspending.

11. The method of claim 5, further comprising reinstating the de-prioritization request upon the user equipment returning to any public land mobile network stored with any de-prioritization request.

12. A user equipment comprising:
a processor;
memory; and
a communications subsystem,
wherein the user equipment is configured to:
store a de-prioritization request; and
remove or suspend the de-prioritization request at the user equipment upon selection of a public land mobile network at the user equipment.

13. The user equipment of claim 12, wherein the user equipment is further configured to store a public land mobile network identity of the public land mobile network requesting the de-prioritization with the de-prioritization request.

14. The user equipment of claim 13, wherein the public land mobile network identity is received in a system information message at the user equipment.

15. The user equipment of claim 12, wherein the user equipment is further configured to determine that the selection of the public land mobile network is performed on the request of a non-access stratum prior to removing or suspending the de-prioritization request.

16. The user equipment of claim 13, wherein the user equipment is further configured to store a list of public land mobile network identities associated with the public land mobile network identity stored with the de-prioritization request.

17. The user equipment of claim 16, wherein the list is limited to identities of public land mobile networks sharing a radio network with the public land mobile network requesting the de-prioritization.

18. The user equipment of claim 16, wherein the user equipment is further configured to determine that the selected public land mobile network has an identity outside of the list of public land mobile network identities prior to removing or suspending the de-prioritization request.

19. The user equipment of claim 12, wherein the user equipment is further configured to determine that the user equipment is able to find a suitable cell in the selected public land mobile network prior to removing or suspending the de-prioritization request.

20. The user equipment of claim 12, wherein the user equipment is further configured to stop a timer for the de-prioritization request after the removing or suspending.

21. The user equipment of claim 12, wherein the user equipment is further configured to allow a timer for the de-prioritization request to keep running after the suspending.

22. The user equipment of claim 16, wherein the user equipment is further configured to reinstate the de-prioritization request upon the user equipment returning to any public land mobile network stored with any de-prioritization request.

23. A non-transitory computer readable medium storing instructions that when executed by a user equipment cause the user equipment to perform operations comprising:
storing a de-prioritization request; and
removing or suspending the de-prioritization request at the user equipment upon selection of a public land mobile network at the user equipment.

24. The non-transitory computer readable medium of claim 23, the operations further comprising storing a public land mobile network identity of the public land mobile network requesting the de-prioritization with the de-prioritization request.

25. The non-transitory computer readable medium of claim 24, wherein the public land mobile network identity is received in a system information message at the user equipment.

26. The non-transitory computer readable medium of claim 23, wherein the method further comprises, prior to the removing or suspending, determining that the selection of the public land mobile network is performed on the request of a non-access stratum.

27. The non-transitory computer readable medium of claim 24, the operations further comprising storing a list of public land mobile network identities associated with the public land mobile network identity stored with the de-prioritization request.

28. The non-transitory computer readable medium of claim 27, wherein the list is limited to identities of public land mobile networks sharing a radio network with the public land mobile network requesting the de-prioritization.

29. The non-transitory computer readable medium of claim 27, wherein the method further comprises, prior to the removing or suspending, determining that the selected public land mobile network has an identity outside of the list of public land mobile network identities.

30. The non-transitory computer readable medium of claim 23, wherein the method further comprises, prior to the removing or suspending, determining that the user equipment is able to find a suitable cell in the selected public land mobile network.

31. The non-transitory computer readable medium of claim 23, the operations further comprising stopping a timer for the de-prioritization request after the removing or suspending.

32. The non-transitory computer readable medium of claim 23, the operations further comprising allowing a timer for the de-prioritization request to keep running after the suspending.

33. The non-transitory computer readable medium of claim 27, the operations further comprising reinstating the de-prioritization request upon the user equipment returning to any public land mobile network stored with any de-prioritization request.

* * * * *